United States Patent [19]

Hardwick

[11] Patent Number: 4,887,761
[45] Date of Patent: Dec. 19, 1989

[54] METHOD OF MAKING EXPLOSIVELY BONDED MULTI-LAMINAR COMPOSITE METAL PLATE

[75] Inventor: Roy Hardwick, Troon, Scotland

[73] Assignee: Imperial Chemical Industries PLC, London, England

[21] Appl. No.: 276,350

[22] Filed: Nov. 25, 1988

[30] Foreign Application Priority Data

Dec. 16, 1987 [GB] United Kingdom ............... 8729340

[51] Int. Cl.$^4$ ............................................. B23K 20/08
[52] U.S. Cl. ................................... 228/107; 228/214; 228/2.5
[58] Field of Search ............... 228/107, 108, 109, 2.5, 228/214; 29/421 E, 421 M; 72/706

[56] References Cited

U.S. PATENT DOCUMENTS

| | | | |
|---|---|---|---|
| 3,397,444 | 8/1968 | Bergmann et al. | 228/108 |
| 3,417,455 | 12/1968 | Pearson | 228/109 |
| 3,449,819 | 6/1969 | Blank | 228/107 |
| 3,473,943 | 10/1969 | Kai | 228/107 |
| 3,813,758 | 6/1974 | Araki | 228/108 |
| 3,987,529 | 10/1976 | Nakagawa et al. | 228/107 |

OTHER PUBLICATIONS

"NASA", SP 5925(03), p. 4, Explosive Bonded . . . Composites, USGPO, 1974.

Primary Examiner—Nicholas P. Godici
Assistant Examiner—Samuel M. Heinrich
Attorney, Agent, or Firm—Cushman, Darby & Cushman

[57] ABSTRACT

A method of explosively bonding metal plates into a multi-laminar composite plate wherein the metal plates are assembled over a restraining means, e.g. an anvil, in overlapping spaced-apart relationship, a driver plate having a mass of at least the total mass of the plates to be bonded is disposed over the top plate of the assembly at a stand-off distance of at least half its thickness, a buffer layer of granular inert material is disposed between the driver plate and the top plate, and an explosive layer is placed on the driver plate and detonated in the direction parallel to the driver plate. The number of plates which can be bonded in a single operation can be increased by placing an explosive layer driver plate and a layer of granular inert material symmetrically on each side of an assembly of metal plates and detonating each explosive charge simultaneously. The method produces multi-laminar composite plates having improved uniformity of bond quality at the interfaces. In addition the method allows increased areas of metal plate to be bonded without producing excessive wave amplitude at the interfaces.

9 Claims, 2 Drawing Sheets

METHOD OF MAKING EXPLOSIVELY BONDED MULTI-LAMINAR COMPOSITE METAL PLATE

This invention relates to an improved method of making explosively bonded multi-laminar composite metal plates.

Multi-laminar bonded composite metal plates are finding increasing application in preference to monolithic plates because the composite laminates may be fabricated from layers of different material so that by appropriate selection of the material the mechanical properties of the laminates may be controlled and improved. Thus, for example, it has been found that a laminate comprising adjacent alternate layers of titanium and aluminum has the beneficial property that any fatigue crack occurring in service is arrested at a bonded metal interface. Such composite laminates are therefore obviously advantageous for use as critical portions of mechanical structures where fatigue cracking might cause dangerous breakdown of the structure. Their use is envisaged for instance in critical portions of high performance aircraft and aerospace structures subjected to high strain levels of variable magnitude which will give rise to fatigue cracking the consequences of which lead to catastrophic failure.

A further use of laminate structures is in the production of protective armor. Here appropriate selection of the mechanical properties of the laminates effectively reduces or prevents the penetration of missiles and particularly avoids the damaging spalling of material from the inner surface which occurs in monolithic structures.

Multi-laminate structures of like materials also have potential use in aircraft structures. Many aircraft structures are produced by bonding a series of laminates in predetermined areas only. The predetermined non-bonded areas are then subjected to pressurisation at suitable temperatures to superplastically form the laminate into a structure of high strength and low weight. Such structures are advantageously produced from aluminum/lithium alloys which are not readily bonded in predetermined areas only by routes other than explosive bonding.

Composite metal laminates are advantageously made by propelling overlapping metal plates together by means of detonating explosive material whereby the plates become bonded at all the plate interfaces.

Techniques of bonding metal layers by explosives have been described in British Patent Specifications 923746, 1017059, 1032019, 1042952, 1168264 and 1248794 and a description of the principles of explosive welding of metal plates is given in a paper published in International Journal of Impact Engineering Vol. 2 No. 1 pp 85–101, 1984 (Pergamon Press Ltd.). In the current method of forming bonded laminates the separate, overlying metal plates are assembled with a small gap between adjacent plates, the preferred spacing being such that any space is at least half the thickness of the plate immediately above that space. The assembly is usually placed on the ground or on a heavy metal anvil. The upper plate of the loose composite assembly, generally termed the flyer plate, is covered with a layer of explosive material having a velocity of detonation less than 120% of the velocity of sound in the metal plate of the assembly having the lowest sonic velocity and the explosive material is initiated to detonate from a point on one side. The resulting progressive detonation, impels the upper plate to collide with and become bonded to the second plate. The two upper plates are then further propelled in unison to collide with and become bonded to the third plate, the collisions continuing until ultimately a bond is formed at all the plate interfaces.

In practice the process is limited because (a) As the mass of the second plate is approximately equal, if not identical, to the first, the momentum of the first plate is significantly reduced by the inertia of the second plate. Successive and significant reductions in momentum occur at each subsequent interface until the momentum is reduced to a point where insufficient collision pressure is produced, at a subsequent interface, for bonding to occur. The number of interfaces which can be bonded is therefore limited. Moreover, the quality of the bond at each successive interface is reduced by this reduction in interfacial collision pressure.

(b) The inertia of the second plate is not sufficient to withstand the impact of the first plate without distortion. The second plate is thus deformed itself so that the composite of two plates now formed will collide with the third plate, but with a collision angle less than that of the initial collision angle of the flyer plate. On impacting the third and subsequent plates, the collision angle is progressively reduced with increasing composite thicknesses until the collision angle becomes too low for bonding to occur.

The cumulative effect of the reduction in interfacial collision pressure and collision angle rapidly results in deterioration in bond quality at successive interfaces, thus severely limiting the number of laminates that can be bonded in one operation.

A further disadvantage is that the area of bond is restricted by the thickness of the flyer plate because it is necessary to "overhit" the flyer plate by using excessive explosive material relative to the bonding requirements of the first interface, in order to ensure that there will be sufficient momentum and angle for bonding at the last interface. This causes excessive collision pressure at the first interface and produces bonding waves of excessively large initial amplitude which quickly increase in amplitude as a function of distance from the explosive initiation point until the wave amplitude becomes excessive, causing fracture of the flyer plate, and the bond quality becomes unsatisfactory.

A further result of the large amplitude of the first interface is that the surface of the top plate is often scarred by the presence of an undulating surface which is a reproduction in profile of the underlying interfacial waves of the first interface. This gives an unacceptable surface finish and at higher amplitudes ruptures may occur in the surface at a short distance from the explosive initiation position.

A still further disadvantage is that the mechanical properties and thickness of alternating layers cannot be varied widely without severely limiting the ability to bond the composite and the number of laminates in the composite. This limitation depends upon the degree of variability in the parameters of collision angle and pressure engendered by such variations of properties and thickness of the laminates.

These disadvantages have previously been partially overcome by using a thicker flyer plate. However this is not wholly satisfactory since the flyer plate is incorporated in the composite so that the resulting composite is not uniform and control of the properties of the composite is impaired. We have now found that the disadvantages can be largely offset by employing a relatively heavy driver plate adjacent to the explosive layer and spaced from the first plate to be bonded into the laminate, and placing between the driver plate and the first plate a layer of granular inert material which does not react chemically when the explosive material explodes. Preferably the layer of inert material is uniform in thickness and density.

Thus in accordance with the invention, in a method of making composite metal plate wherein a plurality of overlapping parallel metal plates are initially assembled with a stand-off space between adjacent plates and the plates are metallurgically bonded at their interfaces by progressively propelling the plates together against a restraining means by means of a layer of explosive material disposed parallel to and overlying the plates and initiated to detonate in a direction parallel to the plates at a velocity of less than 120% of the velocity of sound in the plate having the lowest sonic velocity; in the initial assembly a driver plate is disposed over a first one of the said plates and spaced therefrom at a stand-off distance of at least half its thickness, a buffer layer of granular inert material is disposed between the driver plate and the said first plate and the explosive layer is disposed over the driver plate, the mass of said driver plate being at least equal to the total mass of the plates being propelled by the said explosive layer and the thickness of said buffer layer being sufficient to prevent welding of the driver plate to the said first plate.

On initiation of the explosive the driver plate is deformed progressively below the detonation front thus producing an angular deformation of the driver plate as it is impelled downwards to collide with the surface of the granular inert material beneath. A collision front is thus formed at this surface travelling progressively at the same velocity as the detonation front. The inert material is compressed at this point, thus causing the first plate to be deformed beneath the collision front. The inert granular layer effectively prevents bonding of the driver plate and upper surface of the first plate.

The effect of the high mass ratio between driver and first plate ensures that the momentum of the driver plate is only marginally reduced on its collision with the first plate so that the first plate assumes the angular contour of the driver plate with only a marginal reduction of the angle.

Thus the first plate is impelled, below the progressing driver plate/first plate collision point, toward the surface of the second plate at essentially the same angle and with essentially the same momentum as the driver plate. On impacting the second plate, this plate in turn is similarly deformed with only marginal reduction of the driver plate momentum and angle.

The deformation and impelling of successive metal plates to collide with each lower metal plate continues until the last plate of the composite is reached.

Deformation of the last plate is restricted by the restraining means which may be the ground or a heavy anvil.

A collision pressure is then generated at each interface between the plates and bonding occurs at the interfaces. When a metal anvil is employed it is advantageous to place a layer of granular inert material between the last plate and the anvil to prevent bonding of the plate to the anvil. In this case the last plate will be deformed to compress the inert granular material against the anvil and the collision pressure will then be generated.

Instead of the large reduction of flyer plate momentum and collision angle of the previous method, there is only marginal reduction of momentum and collision angle at each successive interface. The bond quality deterioration at each of these successive interfaces is, therefore, much less marked than in the previous method. The resulting laminar composite has a significantly greater uniformity in bond quality at the multiple interfaces. Additionally a greater number of plates of given thickness can be bonded before the reduction in momentum of the driver plate and collision angle occurs to a degree which will prevent bonding. However, the number of plates which can be bonded is still a function of the plate thickness, as the effect of each plate upon the driver plate momentum and angle increases with plate thickness and its associated mass and inertia.

Since the momentum of the driver plate is transmitted to all the plates to be bonded with little decay of collision pressure and angle at successive interfaces, the collision pressure between the first and second plates need not be excessive so that the wave of the bond at the first bonded interface has a smaller initial amplitude than that of an identical system bonded by the previous method and consequently a much greater length and area can be bonded before the wave amplitude becomes excessive. Because of the overriding influence of the driver plate mass relative to the mass of each laminate the mass and the properties of the laminates can be widely varied without significant effect upon the collision angles and pressures at the successive interfaces. This allows greater flexibility in varying laminate properties and dimensions so that the required properties of the composite may be optimised in respect of fatigue or penetration resistance.

The number of plates which can be bonded together to form the composite laminate may be advantageously increased by carrying out the process with two driver plates each having an associated layer of explosive material initially disposed symmetrically one on each side of an assembly of a plurality of metal plates with a buffer layer of granular inert material disposed between each driver plate and the adjacent outside plate of the assembly, the explosive layers being initiated simultaneously in the same direction. In this mode of procedure the spaced apart plates to be bonded are assembled vertically. When the assembly contains an odd number of plates the plates should preferably be arranged symmetrically with respect to a central plate which serves as the restraining means engendering collision pressure between the plates. When there is an even number of plates in the assembly the plates should preferably be disposed symmetrically with respect to two central plates similarly spaced apart which collide with each other in the process and serve as the restraining means for the other plates. In this case, however, the collision angle between the two central plates is effectively doubled and care must be taken to ensure that the maximum collision angle for bonding is not exceeded. The progressive reduction in angle which occurs at each interface, although less than in the aforedescribed previous method will assist in keeping this doubled collision angle within the range suitable for bonding.

By using the symmetric arrangement, rather than an asymmetric arrangement on an anvil, the number of plates of a given thickness which can be bonded in a single operation can be effectively doubled. Moreover the number of plates which can be bonded by a given amount of explosive material can be increased, an effect which is attributable to the fact that energy loss and consequent reduction in collision pressure which occurs in the asymmetric arrangement when the anvil inertia is overcome, does not occur in the symmetric arrangement.

The method of the invention produces composite laminates with little damage to the external surface of the laminates. However, in order to ensure that good quality and even surfaces are obtained the granular material should have small particle size, the average size being less than 100 um. Although any inert granular material which does not explode or react adversely with the metal may be used, preferred granular materials comprise granular salts, sand or synthetic plastics materials. Granular sodium chloride has been found to be especially suitable as it compresses easily in the processes and is readily removed from the composite laminate by washing with water.

The granules of the inert material may in some cases be advantageously bonded together by means of an adhesive material, for example cellulose acetate, or a water soluble adhesive such as casein or sodium carboxymethyl cellulose. Bonding of the inert granules is especially advantageous when the plates are assembled vertically in the aforedescribed symmetric arrangement. In this case a layer of inert material of the required thickness can be built up by coating the surface of the outside plate with adhesive, sprinkling with the inert material and thereafter alternately applying adhesive and the inert material until the required layer thickness of inert material is built up.

The practice of the invention will now be described by way of example with reference to the accompanying drawings wherein FIG. 1 is a cross-sectional view of an assembly prepared for the bonding process of the invention.

Figure 1:
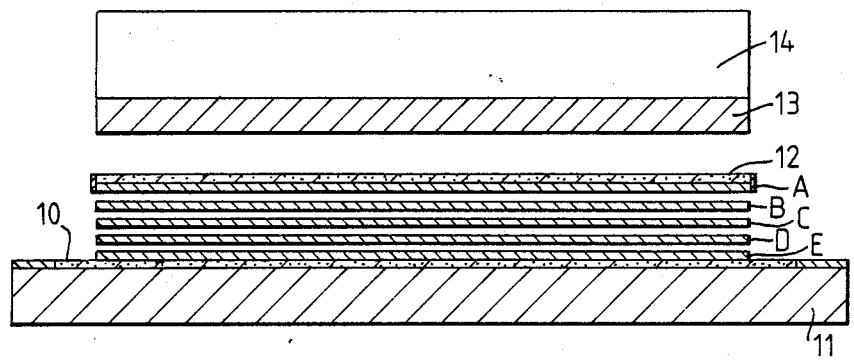

In the assembly of FIG. 1 parallel metal plates A–E are placed on a layer of granular salt 10 (sodium chloride) on top of a heavy metal anvil 11, the spacing between the plates being such that any given space thickness is at least half the thickness of the plate lying immediately above that space. A further layer of granular salt 12 is spread on the upper surface of the upper metal plate A. A relatively thick driver plate 13 is placed above the salt layer 12, the spacing between plate 13 and plate A being approximately equal to the thickness of plate 13. A layer of explosive composition 14 is placed over the upper surface of plate 13 and detonated from an initiation position on the left side (as viewed in FIG. 1).

Figure 2:
FIG. 2 is a schematic cross-sectional view of the assembly of FIG. 1 at an intermediate stage of the bonding process.
Figure 2:
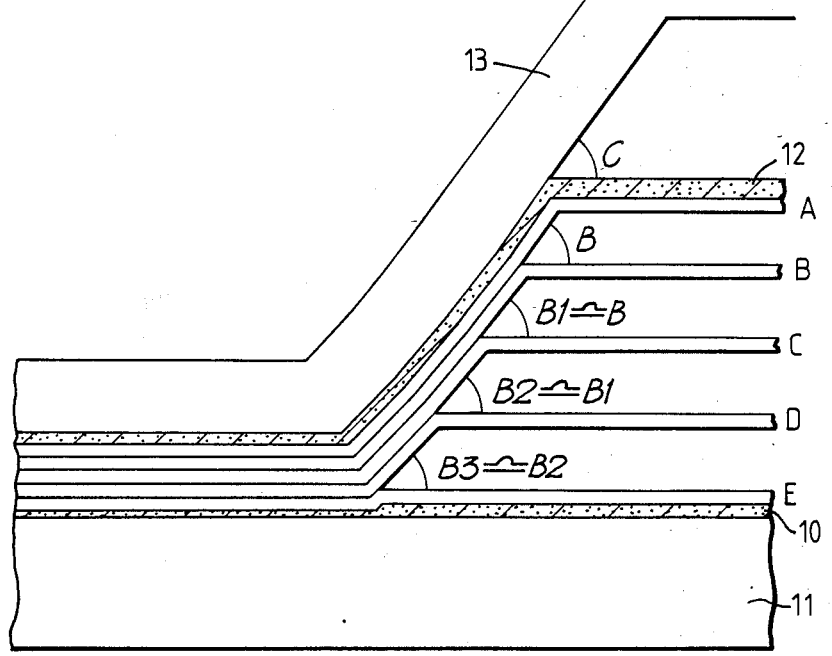

The detonation front progresses through the explosive composition 14 as shown in FIG. 2 and the driver plate 13 is impelled against the salt layer 12, forming a collision front progressing in the same direction as the detonation front and at the same velocity. The salt layer 12 is compressed between the driver plate and plate A and all the plates are deformed below the detonation front as shown in FIG. 2. The collision angle B-B3 between the successive plate A–E is only slightly less than the collision angle C between the driver plate 13 and the salt layer 12 (and upper plate A). The salt layer 10 becomes compressed between the lower plate E and the anvil 11.

During the detonation of the explosive composition 14, plates A–E become welded together to form the desired composite laminar structure. The salt layers 10 and 12 prevent welding of the bonded composite plate to the driver plate 10 and the anvil 11 so that the composite plate can be readily separated from the driver plate and anvil and any adhering salt can be removed by washing with water.

Figure 3:
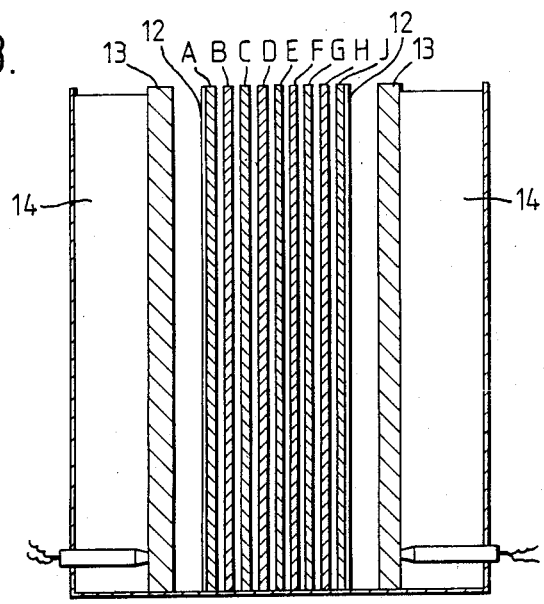
FIG. 3 is cross-sectional view of a symmetric assembly prepared for bonding an odd number of plates by the process of the invention, using an explosive charge on each side of the assembly.
Figure 4:
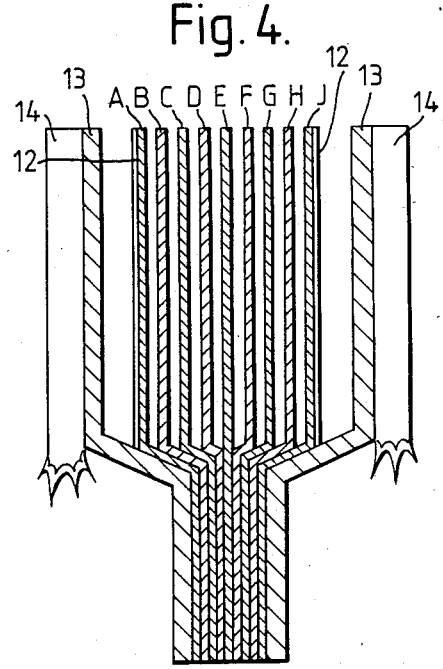
FIG. 4 is a schematic cross-sectional view of the assembly of FIG. 3, viewed at an intermediate stage of the bonding process.

In the assembly for metal plate bonding shown in FIG. 3 and FIG. 4, nine metal plates A–J are assembled in a vertical plane in spaced parallel relationship with gaps between the plates appropriate for explosive bonding. A layer of salt 12 is disposed on the outside surface of the outer plates A and J. Two vertical driver plates 13 are placed, one either side of the assembly and parallel to the salt layers 12, the spacing between each driver plate 13 and the adjacent plate being approximately equal to the thickness of the driver plate 13. A layer of explosive composition 14 is placed against the outer surface of each driver plate 13 so as to cover the plate 13 completely. The two explosive layers 14 are simultaneously initiated to detonate from symmetrically located positions X at their lower edges (as viewed in FIG. 3). The detonation fronts progess as shown in FIG. 4 and plates A–J become bonded together into a composite laminar plate. In the process the two driver plates 13 are deformed and collide in unison progressively and symmetrically with the salt layers 12, whereupon the outer plates A and J are deformed progressively to assume the contour of the driver plates 13 and collide with the plates B and H respectively at a collision angle nearly equal to the collison angle of the driver plate 13 with the salt layer 12. Plates B and H are consequently deformed to collide with plates C and G respectively and this plate deformation and collision sequence continues, without significant decay in the collision angle, until plates D and F collide with, and bond to, the central plate E which is not deformed but serves as the restraining means causing the collision pressure for bonding of the plates at the plate interfaces.

Figure 5:
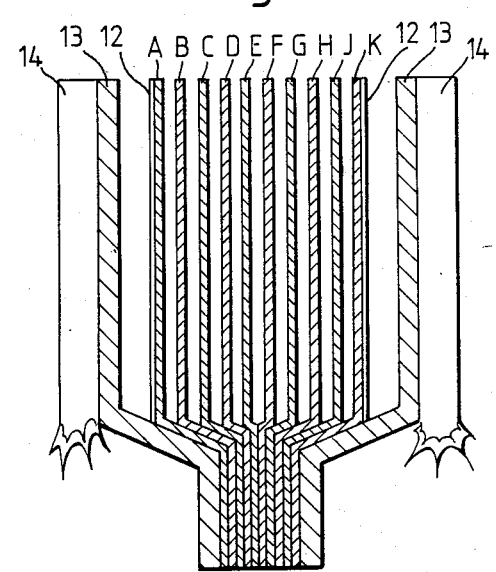
FIG. 5 is a schematic cross-sectional view of a symmetric assembly for bonding an even number of plates, viewed at an intermediate stage of the bonding process.

The metal plate assembly shown in FIG. 5 is the same as that of FIG. 4 except that 10 plates A–K are assembled for bonding, the assembly being symmetrical about a central space between the central plates E and F. When the explosive charges 14 of this assembly detonate the plates E and F are deformed in the same way as the outer plates to collide and bond together to form the restraining means engendering the collision pressure for bonding of the plates.

EXAMPLE 1

A composite laminar metal plate consisting of 3 plates of Grade 1 titanium 600 mm×450 mm×1.5 mm and 2 interposed plates of pure aluminum having the same dimensions was bonding by the following procedure in accordance with the invention.

The surfaces of the 5 layers were ground and degreased. A frame 6 mm deep was constructed upon a 50 mm thick steel anvil and the resulting recess was filled with sodium chloride and levelled off. A first titanium plate was laid upon the surface of the sodidum chloride. Small spacers 1.5 mm high were located upon the titanium surface and a plate of aluminum was rested upon the spacers to contrive a gap of 1.5 mm between the aluminum and titanium plates. Third, fourth and fifth plates of titanium, aluminum and titanium respectively were arranged above the second aluminum plate in identical manner. A 6 mm deep frame was constructed upon the upper face of the upper plate and this was also filled with a layer of sodium chloride. A 12.5 mm carbon steel driver plate was located 12.5 mm above the sodium chloride layer, the gap being uniform over the area. A frame of appropriate height was attached around the periphery of the upper surface of the driver plate and an ammonium nitrate/TNT explosive mixture having detonation velocity of 2,300 meters/sec. was poured into this frame to give an explosive loading of 25 g/cm$^2$.

The explosive was initiated in conventional manner by a booster explosive, located at one edge of the plate.

The metal layers in the bonded composite metal plate could not be physically separated and both upper and lower surfaces of the composite were smooth without any ripples. Metallographic examination of the interfaces showed waves of small amplitude at each interface, the measurements of wave amplitude at the four interfaces being as follows:

| Interface No. | Amplitude (mm) |
|---|---|
| 1 (upper) | .005 |
| 2 | .005 |
| 3 | .003 |
| 4 | .005 |

When the above procedure was repeated without the driver plate and the upper sodium chloride layer, (as in the previously used method) the explosive layer being loaded at 13 g/cm$^2$ in contact with the upper surface of the upper titanium sheet, the upper surface of the bonded composite was rippled with waves which clearly replicated the waveform existing at the upper titanium/aluminum interface. These waves increased in amplitude away from the booster initiation point culminating in total fracture some 100 mm from the three edges of the plate remote from the booster.

The wave amplitude at each interface was as follows:

| Interface No. | Amplitude (mm) |
|---|---|
| 1 (upper) | 0.15 |
| 2 | 0.05 |
| 3 | 0.025 |
| 4 | 0.030 |

These measurements clearly showed the large wave amplitude at the upper interface and the rapid amplitude decay associated with the technique.

EXAMPLE 2

In this Example five steel plates 600×450 mm×1.5 mm were bonded together by the process of the invention as described in Example 1, the explosive loading being 21 g/cm$^2$.

Again the upper and lower surfaces of the bonded composite plate were smooth and the metal layers in the composite could not be physically separated. Metallographic examination of the interfaces again showed very small wave amplitudes of 0.003–0.005 mm.

I claim:

1. A method of making an explosively bonded multilaminar composite metal plate wherein a plurality of overlapping parallel metal plates are initially assembled with a stand-off space between adjacent plates and the plates are metallurgically bonded at their interfaces by progressively propelling the plates together against a restraining means by means of a layer of explosive material disposed parallel to and overlying the plates and initiated to detonate in a direction parallel to the plates at a velocity of less than 120% of the velocity of sound in the plate having the lowest sonic velocity, characterised in that in the initial assembly a driver plate is disposed over a first one of the said plates and spaced therefrom at a stand-off distance of at least half the driver plate thickness, a buffer layer of granular inert material is disposed between the driver plate and the said first plate and the explosive layer is disposed over the driver plate, the mass of said driver plate being at least equal to the total mass of the plates being propelled by the said explosive layer and the thickness of said buffer layer being sufficient to prevent welding of the driver plate to the said first plate.

2. A method as claimed in claim 1 wherein the restraining means is a metal anvil and a layer of granular inert material is disposed between the anvil and the metal plate adjacent thereto.

3. A method as claimed in claim 1 characterised in that initially two driver plates each having an associated layer of explosive material, are disposed symmetrically one on each side of the assembly of a plurality of metal plates with a buffer layer of granular inert material being disposed between each driver plate and the adjacent outside plate of the assembly and the layers of explosive material are initiated simultaneously to detonate in the same direction thereby progressively propelling the driver plates towards each other so that the plates become bonded at their interfaces.

4. A method as claimed in claim 1 wherein the granular inert material comprises material having an average particle size less than 100 μm.

5. A method as claimed in claim 1 wherein the granular inert material is selected from the group consisting of granular salt, sand and synthetic plastics material.

6. A method as claimed in claim 5 wherein the granular inert material comprises sodium chloride.

7. A method as claimed in claim 1 wherein the buffer layer comprises granules bonded together with an adhesive material.

8. A method as claimed in claim 7 wherein the adhesive material is selected from the group consisting of cellulose acetate, casein and sodium carboxymethyl cellulose.

9. A method as claimed in claim 7 or claim 8 wherein at least one layer of granular inert material is prepared by applying alternate coatings of adhesive and granular inert material to a metal surface.

* * * * *